Jan. 10, 1950  V. E. PRATT ET AL  2,493,998
COMBINATION PROJECTOR AND PRINTER

Original Filed March 7, 1945  7 Sheets-Sheet 4

INVENTORS
VERNEUR E. PRATT
BY GEORGE F. GRAY
Van Deventer & Grier
ATTORNEYS

Jan. 10, 1950  V. E. PRATT ET AL  2,493,998
COMBINATION PROJECTOR AND PRINTER
Original Filed March 7, 1945  7 Sheets-Sheet 5

INVENTORS
VERNEUR E. PRATT
BY GEORGE F. GRAY
ATTORNEYS

Jan. 10, 1950 V. E. PRATT ET AL 2,493,998
COMBINATION PROJECTOR AND PRINTER
Original Filed March 7, 1945 7 Sheets-Sheet 6
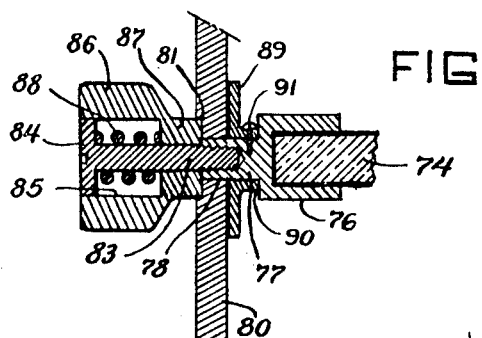
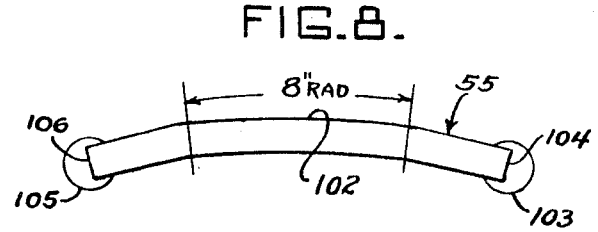
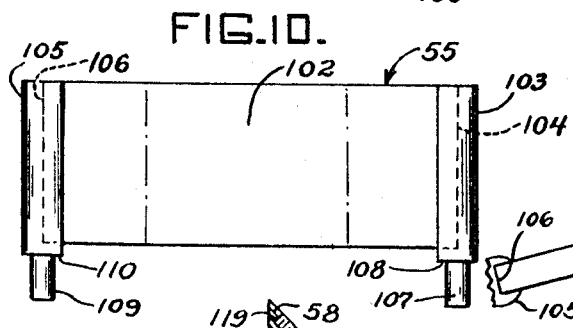
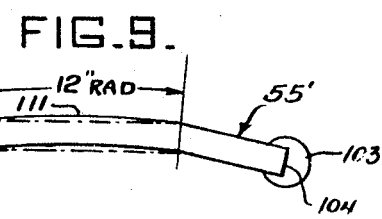
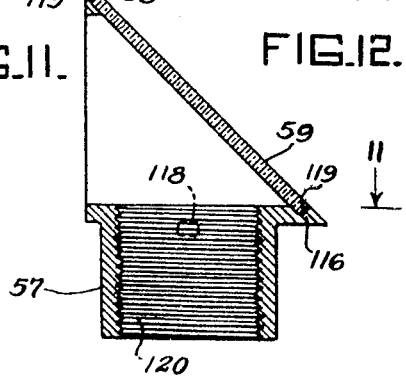
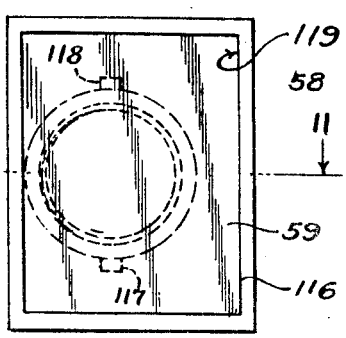
INVENTORS
VERNEUR E. PRATT
BY GEORGE F. GRAY
ATTORNEYS Jan. 10, 1950 V. E. PRATT ET AL 2,493,998
COMBINATION PROJECTOR AND PRINTER
Original Filed March 7, 1945 7 Sheets-Sheet 7

INVENTORS
*VERNEUR E. PRATT*
BY *GEORGE F. GRAY*
*Van Deventer & Grier*
ATTORNEYS.

Patented Jan. 10, 1950

2,493,998

UNITED STATES PATENT OFFICE 2,493,998

COMBINATION PROJECTOR AND PRINTER

Verneur E. Pratt and George F. Gray,
Norwalk, Conn.

Original application March 7, 1945, Serial No. 581,354. Divided and this application October 3, 1946, Serial No. 700,924

8 Claims. (Cl. 88—24)

This invention relates to improvements in combination projector and printer, and is directed more particularly to the provision of a reading machine for microfilm or the like, including means for producing enlarged prints of any desired frame.

The present application is a division of the co-pending application Serial Number 581,354, filed March 7, 1945.

An object of the invention is the provision in a projector of a novel film gate or pressure plate which consists of a curved transparency adapted to be positioned in the machine in one position for projecting negatives, and adapted to be reversed for projecting positives. In each of the aforementioned positions the negative or the positive microfilm emulsions are not in contact with the gate or pressure plate and, therefore, the emulsions do not become scratched.

Yet another object of the invention is the provision in a microfilm reading machine of a casing, a turret mounted thereon carrying film advancing mechanism, a film gate or pressure plate, and a condensing lens system, said turret being freely movable on said casing to a plurality of positions, and illuminating means in said casing and depending from said turret, so that illumination is supplied to the turret regardless of its position.

An object of the invention is the provision in a projector of means for projecting an image downwardly, means in said projector for reflecting said image laterally upon a screen in a side wall of said projector and the provision of a second mirror movable to, or away from, a position to reflect said image horizontally in an opposite direction and upon a light sensitive surface supported on the opposite wall of said projector.

Other objects and advantages of the invention will be apparent to those skilled in the art upon a study of the accompanying drawings and the specification.

Referring to the drawings—

Figure 7 is a sectional view taken along the line 7—7 of Figure 2, showing the indexing knob associated with the printing mirror;

Figure 8 is a plan view of one form of our pressure plate;

Figure 9 is a plan view of a modified form of the same;

Figure 10 is an elevation of a film gate or pressure plate with its supporting studs secured thereto to form a unitary structure;

Figure 11 is an enlarged cross sectional view of the mirror-objective lens unit;

Figure 12 is a plan view of the mirror-objective lens unit;

Figure 1:
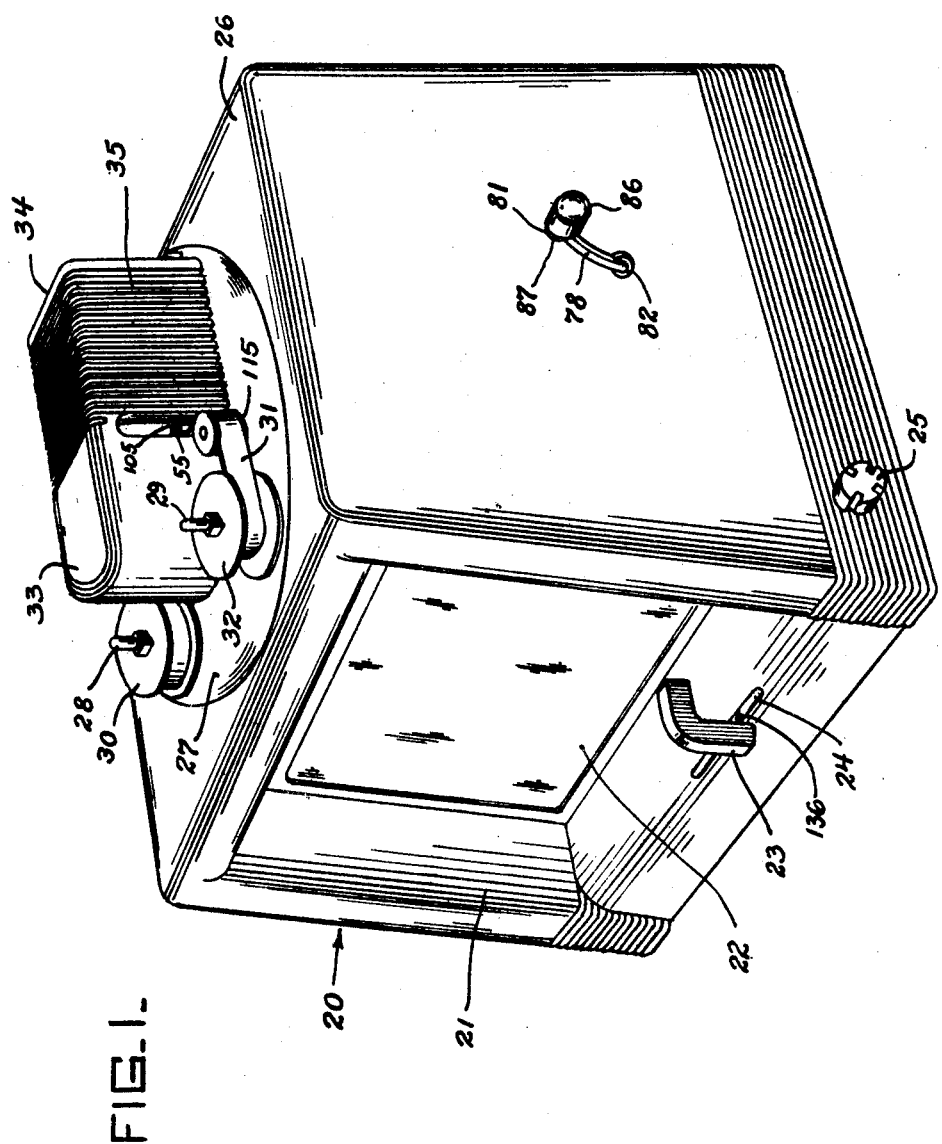
Figure 1 is a perspective view of our new and improved projector showing the turret on the top and the viewing screen on one side thereof.

Referring first to Figure 1, the new and improved projector consists of a casing generally designated by the numeral 20. The front portion 21 of this casing is indented or recessed to support a viewing screen 22. On the front of the casing is a control handle 23 carrying a depending stud (not shown) which moves along in a slot 24 as the control handle is moved to the right or to the left. Associated with the stud on the control handle and mounted inside the casing is a control for the film feed which will be hereinafter more fully explained in connection with Figure 13. On the right hand side of the casing 20 is a knob 25 which controls the supplying of current to the source of illumination.

The top wall 26 of the casing has a depression formed therein which will be described in connection with Figure 2. Rotatably supported in the depression is a plate 27 which will hereinafter be termed a turret plate.

Mounted on the turret plate in spaced relation to each other are reel shafts 28 and 29. The reel shaft 28 may carry a reel 30 of film 31. A take-up reel 32 may be mounted on the reel shaft 29 and the film 31 secured thereto after it is passed through the film gate which will presently be described. The shafts 28 and 29 in their upper portions are preferably square so as to engage square holes in the reels and drive the same. The turret also carries a housing 33 for the mirror-objective cell and the film gate to be presently described; a housing 34 for the condensing lens system, has a finned portion 35 for the illuminating mirror to be presently described.

Figure 2:
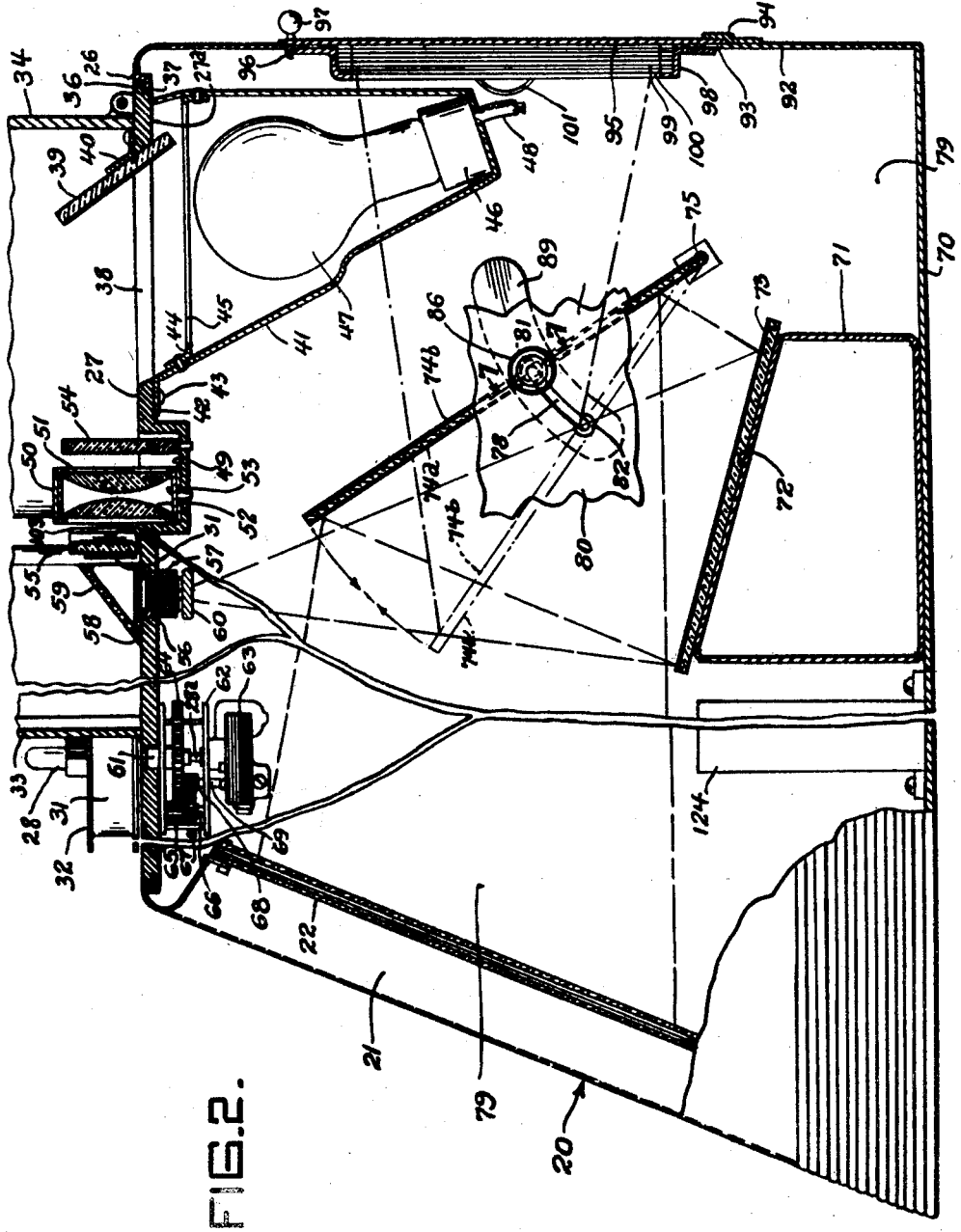
Figure 2 is a sectional elevation of the projector shown in Figure 1, with the turret positioned as shown in Figure 1.

Referring now to Figure 2, which is a sectional elevation of the projector shown in Figure 1, the top wall 26 of the casing has an annular depression 36 formed therein leaving an annular shoulder 37 upon which the turret plate 27 rides. Suitable balls or other friction reducing elements (not shown) may be interposed between the ledge 37 and the turret plate 27 to facilitate the rotation of the turret. The turret plate 27 has a rectangular opening 38 formed therein. Mounted in the opening 38 is a first surface mirror 39 carried on a bracket 40 which is secured to the plate 27. A lamp housing 41 has its upper end flanged at 42 and this flange is secured to the lower face 27ª of the turret plate 27 in any suitable manner, for example, by means of screws 43. The open end of the lamp house permits the delivery of light through the opening 38. Within the lamp house near the upper end thereof is a suitable bracing web 44 having a masked opening 45 formed therein.

In the lower portion of the lamp house is a socket 46 in which a lamp 47, which forms the source of illumination for the projector, is mounted. A conductor 48 leads from the socket 46 to a source of current and a light switch, which will be described in connection with Figure 13.

The turret plate 27 has a depression 49 formed therein, and supported in this depression is a condensing lens cell 50 which carries condensing lenses 51 and 52 with a spacer sleeve 53 therebetween. Also supported in the depression 49 is mounted a heat absorbing lens 54. Positioned on the turret plate 27 in front of the condensing lens (to the left of the condensing lens as seen in Figure 2) is our new and improved film gate or pressure plate 55 which will presently be described in detail. Mounted in a hole 56 formed in the turret plate 27 is the shank portion 57 of a mirror-objective lens element 58. This element includes a mirror 59 inclined at a 45° angle with the axis of the condensing lens cell 50. The shank portion 57 has its axis cutting the mirror at substantially a midpoint therein and adjustably carries an objective lens 60.

The reel shaft 28 has a lower portion which is round and which is journalled in a bushing 61 mounted in the plate 27. The lower portion 28ª of the shaft 28 is journalled in a plate 62 carrying a small electric motor 63. A gear 64 is keyed to the shaft 28 and, meshing with the gear 64 is a pinion 65 carried on a shaft 66 which is journalled in the plate 62 and in the turret plate 27. Secured to the pinion 65 is a gear 67 which meshes with a pinion 68 carried on the motor shaft 69.

The reel shaft 29 is similarly arranged and has associated therewith gears, pinions, and an electric motor duplicating those just described in connection with the reel shaft 28, the motor being designated by the numeral 63ª and the gears corresponding to the gears 64 and 67 being respectively designated as 64ª and 67ª.

Positioned on the base 70 of the casing is a support or standard 71, the upper portion 72 of which forms the support for a first surface mirror 73. This mirror is inclined to the right with the horizontal and normally receives the emergent beam from the objective lens 60.

A double faced first surface mirror 74 is secured to a supporting shaft 75 suitably journalled in the side walls 79 and 80 of the casing. This mirror has secured thereto a yoked member 76 (see Figure 7) which has a stud 77 extending into a slot 78 formed in the right side wall 80 of the casing. Concentric with the right end of the slot, as seen in Figure 2, a counterbore 81 is provided. At the left end of the slot is formed a second counterbore 82. A shouldered screw 83 threadedly engages a central hole in the stud 77. This screw has an enlarged head 84 which forms a working fit in a counterbore 85 formed in a knob 86. The shank 87 of this knob is of a diameter to form a working fit in the counterbore 81. Within the counterbore 85 and surrounding the shank of the screw 83 is a spring 88 which urges the knob toward the wall 80 of the casing.

The purpose of the slot 78 is to permit the mirror 74 to be swung within the cabinet to a plurality of positions which are defined by the engagement of the shank 87 of the know 86 with the counterbore 81, for one position of the mirror 74 or with the counterbore 82 for another position of the mirror.

A kidney-shaped shield 89 has a boss 90 with a hole therein which fits the shank 77. This shield is secured to the shank 77 in any suitable manner, for example, by means of a pin 91, so that it always spans or covers the slot 78, thereby making the casing light-tight. When the mirror 74 is in the position shown in solid lines in Figure 2, light projected upon the mirror 72 by the objective lens 60 is reflected up to the surface 74ª of the mirror and this surface in turn reflects it to the screen 22.

The rear wall 92 of the casing has an opening 93 formed therein, and adjacent to the bottom edge of this opening is a locating strip 94. A door 95 is adapted to have its bottom edge positioned in engagement with the locating strip 94 and carries at the top a retaining spring 96 which engages the upper edge of the opening 93. A knob 97 is provided to facilitate the removal of the door 95. Mounted on the door, and extending through the opening 93 is a frame 98 which holds a pad 90 formed of light-sensitive paper, for example. The paper may be perforated in line with the opening 100 formed in the frame 98 with the exception of portions at the ends thereof which form tabs 101 to facilitate the removal of an exposed sheet from the block or pad 99.

When the mirror 74 is in the position shown in dot-dash lines, the second surface 74ᵇ receives the emergent beam from the objective lens 60 and reflects it upon the block 99 within the opening 100 of the frame 98.

The film gate or pressure plate 55 is shown in detail in Figures 8 and 10. The film gate consists of a curved plate of glass or the like, the midportion 102 of which the curve is slightly flatter, as shown in Figure 8. This midportion lies in the field of the optical system, and although slightly curved presents a practically flat field for the portion of the film to be projected.

A mounting stud 103 has a slot 104 formed therein, and one end of the pressure plate is cemented in this slot. A second mounting stud 105 has a similar slot 106 which is cemented to the other end of the pressure plate 55. The stud 103 has a portion 107 of reduced diameter, thereby providing a shoulder 108. Likewise, the stud 105 has a portion 109 of reduced diameter defining a shoulder 110 which is in horizontal alignment with the shoulder 108.

In Figure 9 is shown a modified form of pressure plate 55ª. The midportion 111 is formed of a curve of a substantially longer radius than the radius of the body of the pressure plate, so as to provide a continuous curve and yet hold the film in intimate contact with the portion of longer radius, with the result that the field of the projected image is almost flat.

Figure 6:
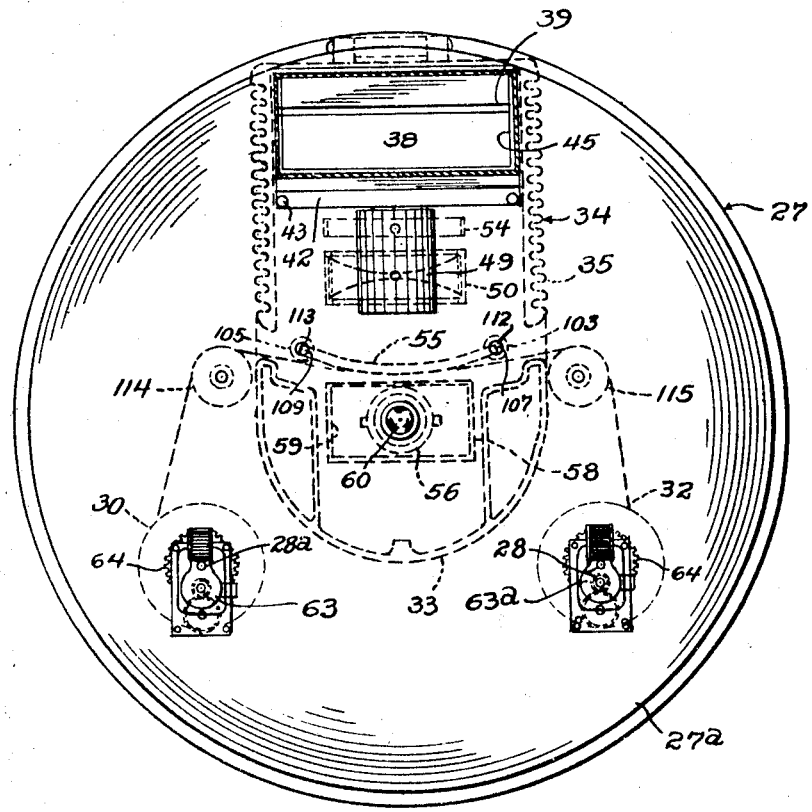
Figure 6 is a bottom view of the turret of Figure 4.

Referring again to Figure 10, the portions 107 and 109 fit in holes 112 and 113 formed in the turret plate 27. These holes may be seen in the bottom view, Figure 6.

Figure 4:
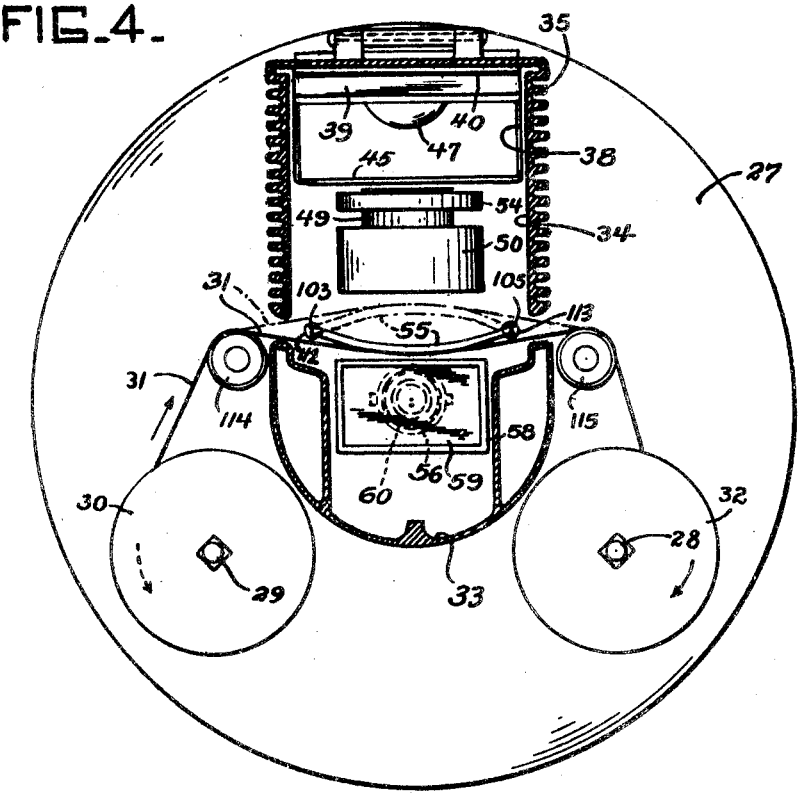
Figure 4 is a reduced plan view of the turret showing the film gate or pressure plate positioned for projecting negative film. The emulsion side of the film does not come in contact with the glass or other transparent material forming the film gate or pressure plate.

Referring now to Figure 4, the pressure plate 55 is mounted with the shank 109 of the stud 105 engaging the hole 113 and the shank 107 of the stud 103 engaging the hole 112. A reel 30 carrying negative film 31 is positioned on the reel shaft 28. The film is led over a roller 114, then across to a second roller 115 in alignment therewith and thence the film passes on and is secured to the take-up reel 32. The rollers 114 and 115, as may be seen in Figure 4, are so positioned on the turret plate 27 that a line tangent to both rollers falls behind the surface of the pressure plate engaged by the film. Therefore, the tension on the film holds the film in contact with the surface of the pressure plate 55.

Now, in order to maintain a substantially uniform pressure of the film against the pressure plate 55, we employ a motor 63 tending to drive the take-up reel 32 in the direction of the solid arrow, and a second motor 63ª is geared to the shaft 29 and tends to drive the reel 30 in the direction of the dotted arrow. This arrangement is described in our co-pending application Serial Number 539,740, filed June 10, 1944, now Patent No. 2,412,551 of December 10, 1946. The motors are connected together with a potentiometer between them so that as the current supplied to one motor is increased, the current supplied to the other motor is decreased with the result that the motor receiving the greatest amount of current drives the film, and the other motor acts as a brake. This arrangement will be more fully described in the circuit diagram, Figure 13.

Figure 5:
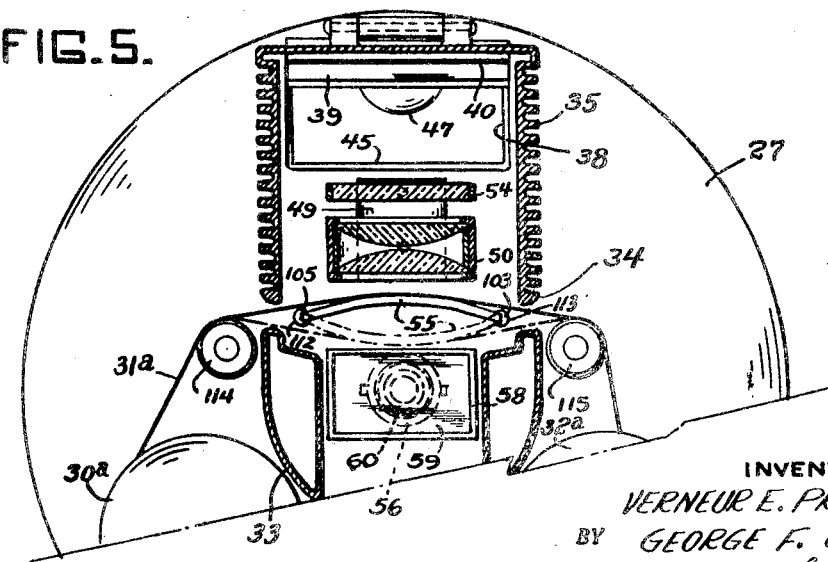
Figure 5 is a view similar to Figure 4, except that the film gate or pressure plate is turned to a reversed position so as to project positive film.

Light from the condensing unit 50 passes through the pressure plate 55 thence through the film. It is then directed downwardly by the mirror 59 in the mirror-objective lens unit 58 and passes through the objective lens and onto the mirror 73 and the surface 74ª of the mirror 74 and thence to the screen 22, where the image is to be viewed on the screen. If the image is one which it is desired to reproduce, the mirror 74 may be shifted to the dot-dash position (Figure 2) and the surface 74ᵇ of this mirror will direct the light to the surface of the pad 99. If the film to be projected is a positive film instead of a negative, the pressure plate 55 may be lifted out from the position shown in Figure 4, turned end for end, as shown in Figure 5, and reinserted with the shank of the stud 103 engaging the hole 113. A reel 30ª carrying film 31ª is positioned on the reel shaft 29 and film 31ª is threaded over the roller 114, in contact with the rear of the pressure plate 55 and may pass over the roller 115 to the take-up reel 32ª.

When the pressure plate 55 is in the position shown in Figure 5 it will be noted that a line tangent to the upper surfaces of the roller 114 and 115 lies forwardly of the pressure plate 55 so that when the take-up reel 32ª is driven by its motor 63 and the reel 30ª is braked or retarded by its motor 63ª, the positive film is firmly held in contact with the pressure plate 55. If the objective lens had previously been in focus with the negative film, it would have to be adjusted to compensate for the moving of the focal plane (the active surface of the pressure plate 55).

The mirror-objective lens mount 58 is shown in detail in Figures 11 and 12, Figure 11 being a sectional view seen along the lines 11—11 of Figure 12. The unit 58 includes a body portion 116 having a shank portion 57 previously described as fitting in a hole 56 in the turret plate. The shank 57 is provided with tongues or keys 117 and 118 which engage corresponding slots formed in the hole 56 for properly orienting the mirror with the optical axis of the projector. The body portion 116 has a rectangular depression 119 formed therein and this depression forms a socket for the mirror 59. The interior bore of the shank 57 is provided with threads 120 which are engaged by corresponding threads on the barrel of the objective lens 60 so that the latter may be screwed in or out to focus the image on the screen 22 or on the surface of the block 99.

Figure 13:
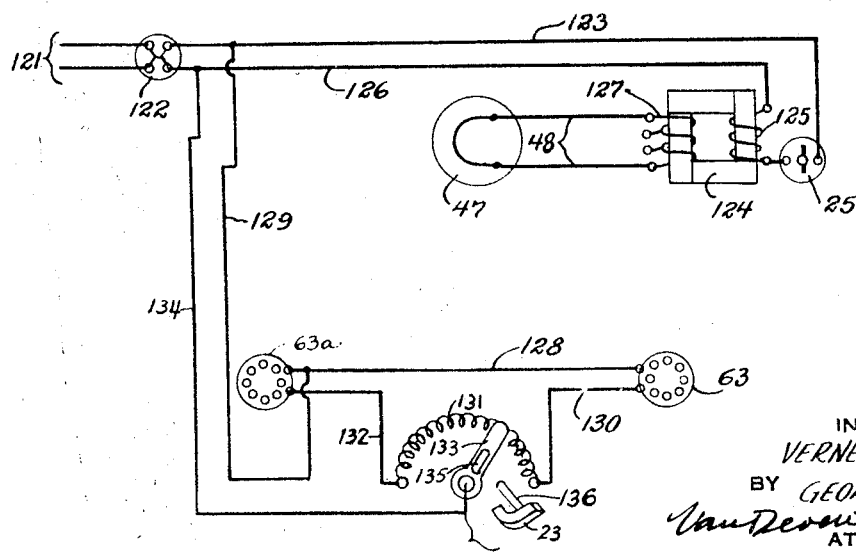
Figure 13 is a diagrammatic sketch showing the electrical circuits and controls in the projector.

Figure 13 shows a wiring diagram wherein a pair of conductors are connected to a source of current 121. These conductors lead to a switch 122, and leading from the switch is a conductor 123 which is connected to switch 25. A transformer 124 has a primary winding 125, one end of which is connected to the switch 25 and the other end of which is connected to a conductor 126 leading from the switch 122. The transformer has a secondary winding 127, the terminals of which are connected to the projection lamp 47 by means of wires 48. The motor 63 has one terminal thereof connected via a wire 128 to one terminal of the motor 63ª. The wire 128 is connected via wire 129 to the conductor 123. The motor 63 has its other terminal connected via wire 130 to one end of a resistance winding 131 and the other end of the resistance winding is connected via a wire 132 to the other terminal of a motor 63ª. The resistance winding 131 is arranged so that the turns thereof may be contacted by a movable arm 133, and the movable arm is in turn connected via a wire 134 to the conductor 126. The movable arm 133 carries a slot 135 which is engaged by a depending stud 136 in the control handle 23. As the control handle is moved to the right or left along the slot 24 (Figure 1) the control arm 133 is swung in either direction, and thereby cuts a greater resistance in series with one of the motors and reduces the resistance in series with the other of the motors (the motors being 63 and 63ª).

As stated above, the motor having less resistance in series therewith operates to drive the film against the urge of the other motor, which has a greater resistance in series therewith, and thereby the last mentioned motor acts as a brake. The switch 122 controls all current going into the machine and the switch 25 controls the illumination of the projection lens 47.

Figure 3:
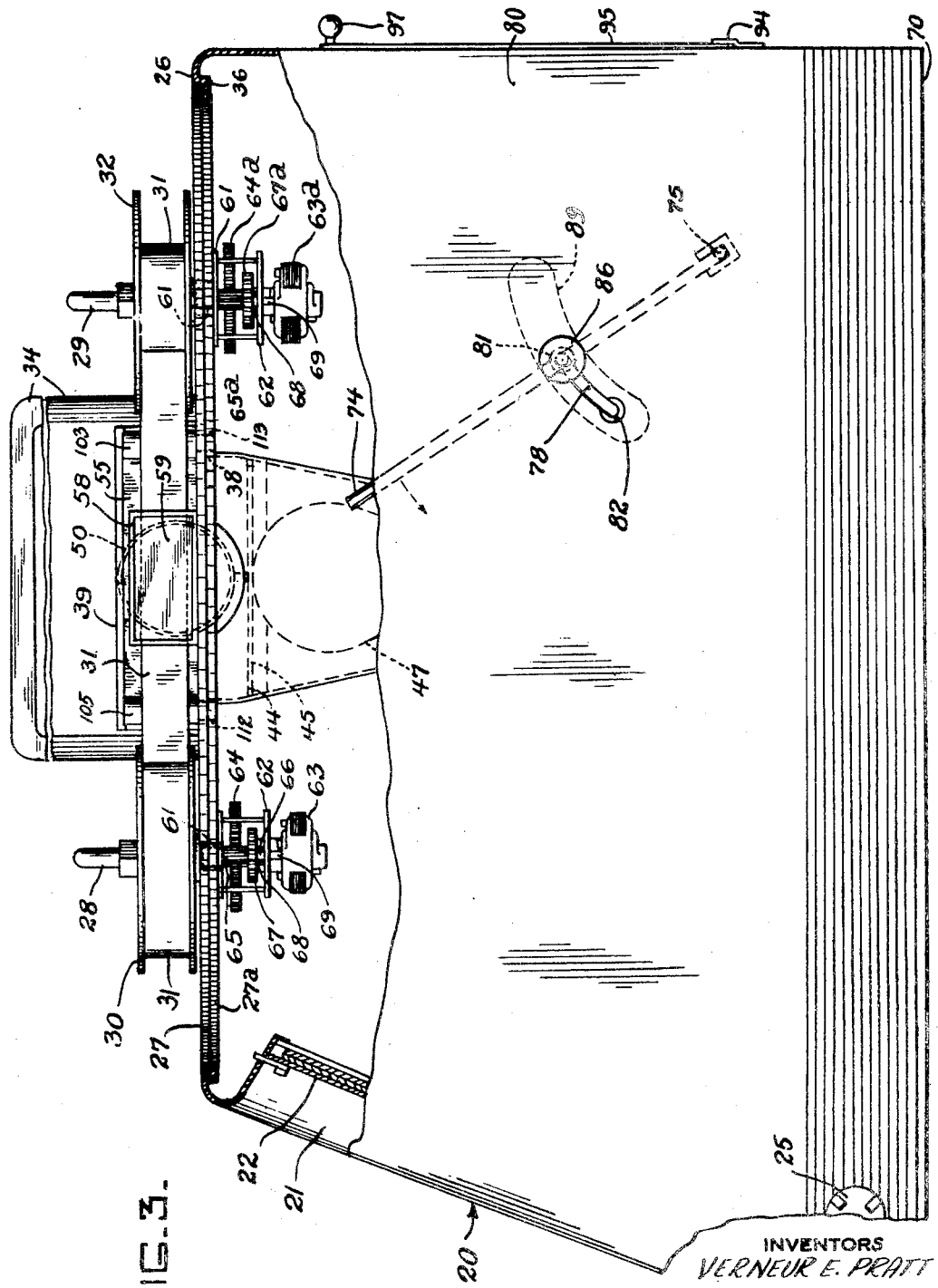
Figure 3 is a sectional elevation similar to Figure 2, except that the turret has been rotated 90° from the position shown in Figure 2 and also in which the printing mirror diverts the image to a sensitized surface carried on the rear wall of the projector.
Figure 14:
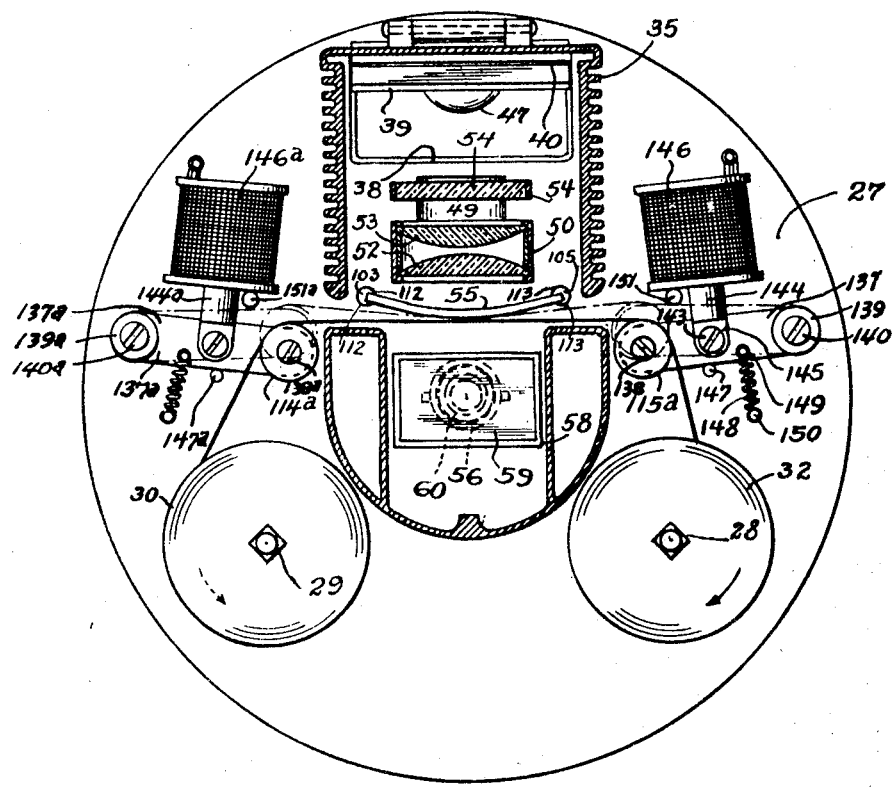
Figure 14 shows a further modification of the invention wherein the pressure plate is stationary and the film is out of contact therewith while being moved and brought into contact therewith for projecting under control of solenoids.

Referring to Figure 14, which is a further modification of the invention, the turret plate 27 carries reel shafts 28 and 29 upon which are mounted reels 30 and 32, respectively. The shafts 28 and 29 are driven by motors exactly like those described above in connection with Figures 2 and 3. The mirror and objective-lens holder 58 is the same as is shown in Figure 4 and the same condensing lens assembly 50 is employed. Between the lens holder 58 and the condensing lens assembly 50 the turret plate 27 has holes 112 and 113, and the pressure plate 55 is mounted with the shank of the stud 105 engaging the hole 113 and the shank of the stud 103 engaging the hole 112, just as has been above described in connection with Figure 4. A reel 30 carrying either negative or positive film is positioned on the reel shaft 28 and the film is led over a roller 114ª, then across to a second roller 115ª in substantial alignment therewith, and thence the film passes on and is secured to the take-up reel 32. The rollers 114ª and 115ª are mounted on the turret plate in a novel manner, and since both mountings and the associated elements are identical except that they are rights and lefts, it is only necessary to describe one of them.

Figure 15:
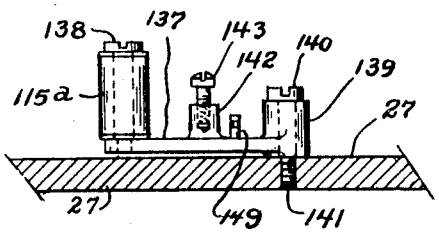
Figure 15 is a detailed view of one of the arms supporting the film rollers.

The roller 115ª, as shown in Figures 14 and 15, is secured to an arm 137 by means of a shouldered screw 138 engaging a threaded hole therein adjacent to one end thereof. The other end of the arm 137 is provided with a boss or hub 139 which is journalled on a shouldered screw 140 having threads 141 which engage a threaded hole in the plate 27. Intermediate the ends of the arms 137 is an upstanding boss 142 which carries a tapped hole which is engaged by a shouldered screw 143. A solenoid plunger 144 has a flattened portion 145 at one end thereof and a bearing hole with sufficient clearance is formed therein and is engaged by the shank of the screw 143. A solenoid winding 146 is mounted on the turret plate 27 and the plunger 144 may reciprocate therein. A stop pin or boss 147 mounted in the plate 27 defines the normal position of the roller 115ª and a spring 148 having one end connected to a pin 149 in the arm 137 and having its other end connected to a stud 150 in the plate 27 urges the arm 137 to its normal position.

As stated above, the roller supports are identical except for rghts and lefts, so the elements associated with the roller 114ª will be given the same numerals as just described, with the addition of the letter "a" after each numeral.

It will be seen in Figure 14 that when the rollers 114ª and 115ª are in their normal positions, with their supporting arms 137ª and 137, respectively, in contact with the stops 147ª and 147, the film just clears the face of the pressure plate 155. Thus, it can be seen that whether the emulsion is on the side of the film facing the pressure plate or on the side facing the objective-lens unit, it cannot be scratched while it is being moved.

Now, when the film is at rest and is to be projected, the energization of the solenoids 146 and 146ª will effect the pulling in of the plungers 144 and 144ª and thereby swing the arms 137 and 137ª upwardly, as viewed in Figure 14, to the positions shown in dot-dash lines, stops 151 and 151ª also being provided for defining these positions. When the rollers are in these positions, a tangential line spanning them passes well behind the face of the pressure plate, and the opposite pull of the motors on the shafts 28 and 29 pulls the film taut so that it is spanning the slightly curved surface of the pressure plate under tension and will, therefore, make a good projection. As soon as the solenoids 146 and 146ª are de-energized, the springs 148 and 148ª immediately pull the arms 137 and 137ª downwardly until they contact the stops 147 and 147ª, respectively, and the film is ready to be moved again.

Now, for conveniently operating and controlling the film feed and solenoids, the stud 136 projecting inwardly from the control handle 23 may, in an endwise manner, bear against a pair of contact arms. These contact arms are normally closed and are connected in series with the solenoids and the source of current, so that normally after the main switch is turned on, the solenoids are energized and the rollers are held in the projecting position. When it is desired to move the film in either direction, the control handle 23 is pushed in so as to operatively engage the slot in the movable arm 135, and as this is done, the pair of contacts in the solenoid circuit are opened, thereby de-energizing the solenoids and allowing the rollers 114ª and 115ª to immediately assume the normal positions, so that as the control arm is moved in either direction, the film may be moved in either direction without being in actual contact with the pressure plate 55.

Although we have described a preferred embodiment of the new and improved projector, it is obvious that many changes may be made in the arrangement herein shown and described without departing from the spirit of the invention as defined in the following claims.

What is claimed is:

1. In a projector, a casing, film supporting and advancing means carried on a top wall of said casing including a lens having its optical axis perpendicular to said top wall, a screen carried in one side wall of said casing, a light sensitive medium carried in an opposite wall of said casing, means for illuminating said film, a fixed mirror in said casing, a double surface mirror in said casing, a support for said last mirror, means connected to said support for adjusting said mirror to two positions whereby in one of said positions one surface of said mirror will receive the emergent beam from said lens via said fixed mirror and reflect same to said screen and when in the other of said positions will reflect said beam directly to said sensitive surface, said mirror in either of said positions having a reflecting surface forming part of the light path between said lens and its focal plane, said screen and said light sensitive surface lying at the front focal plane of said lens determined by the adjusted position of said mirror.

2. In a projector, a casing having a front panel supporting a screen, a holder for a light sensitive medium carried in the rear wall of said casing, means forming a stepped opening in the upper wall of said casing, a plate mounted in said stepped wall and forming a working fit therewith whereby said plate may be rotated to properly orient a projected image, film supporting and advancing means carried on said plate, a lens, means for illuminating said film to project an image of same via said lens downwardly and into said casing, a double surface mirror in said casing, a support for said mirror, means connected to said support for adjusting said mirror to two positions whereby in one of said positions one surface of said mirror will receive the emergent beam from said lens via said fixed mirror and reflect same to said screen and when in the other of said positions will reflect said beam directly to said sensitive surface, said mirror in either of said positions having a reflecting surface forming part of the light path between said lens and its focal plane, said screen and said light sensitive surface lying at the front focal plane of said lens determined by the adjusted position of said mirror.

3. In a projector, a casing, means supported on said casing for projecting an image vertically downward into said casing, a screen mounted in one wall of said casing, a light-sensitive medium supported in the wall of said casing opposite said first-mentioned wall, a double surface mirror in said casing, a support for said mirror, means connected to said support for adjusting said mirror to two positions whereby in one of said positions one surface of said mirror will receive the emergent beam from said lens via said fixed mirror and reflect same to said screen and when in the other of said positions will reflect said beam direct to said sensitive surface, said mirror in either of said positions having a reflecting surface forming part of the light path between said lens and its focal plane, said screen and said light sensitive surface lying at the front focal plane of said lens determined by the adjusted position of said mirror.

4. A projector according to claim 3 in which at least one wall of said casing has a depression formed therein adapted to support a group of light-sensitive sheets, said depression having an opening therein communicating with the interior of the cabinet and forming a frame defining the boundaries of the image impressed upon the innermost light-sensitive sheet.

5. In a projector, a casing, film supporting and advancing means carried on top of said casing, a screen mounted in an opening formed in one wall of said casing, a light-sensitive medium carried in the wall of said casing opposite said first mentioned wall, means to illuminate said film and an optical system including a lens adapted to direct an image from said film onto said casing, a fixed mirror in said casing, a double surface mirror in said casing, a support for said mirror, means connected to said support for adjusting said mirror to two positions whereby in one of said positions one surface of said mirror will receive the emergent beam from said lens via said fixed mirror and reflect same to said screen and when in the other of said positions will reflect said beam directly to said sensitive surface, said mirror in either of said positions having a reflecting surface forming part of the light path between said lens and its focal plane, said screen and said light sensitive surface lying at the front focal plane of said lens determined by the adjusted position of said mirror.

6. A projector according to claim 5 in which said film supporting and advancing means is carried on a turret rotatably supported on top of the casing and in which said means to illuminate the film is also mounted on said turret and extends downwardly within the casing.

7. A projector according to claim 5 in which an annular turret supporting ledge is formed in the top of said casing, and in which said film supporting and advancing means is carried on a turret rotatably supported on said ledge, and in which said optical system has its axis extending vertically through the center of said turret to fall upon either said mirror means dependent upon the adjustment of said double surface mirror, said means to illuminate the film depending from said turret and positioned within said casing, and means on said turret to direct light from said last mentioned means to said optical system.

8. In a projector, a casing, film supporting and advancing means carried on top of said casing, a screen mounted in an opening formed in one wall of said casing, a light-sensitive medium carried in the wall of said casing opposite said first mentioned wall, means to illuminate said film and an optical system including a lens adapted to direct an image from said film into said casing, a fixed mirror in said casing in the emergent beam from said lens, a double surface mirror in said casing, a support for said mirror extending through a side wall of said casing, means connected to said support outside said casing for adjusting said mirror to two positions therein whereby in one of said positions one surface of said mirror will receive the emergent beam from said lens via said fixed mirror and reflect same to said screen and when in the other of said positions will reflect said beam directly to said sensitive surface, said mirror in either of said positions having one of its reflecting surfaces form part of the light path between said lens and its focal plane, said screen and said light sensitive surface lying at the front focal plane of said lens determined by the adjusted position of said mirror.

VERNEUR E. PRATT.
GEORGE F. GRAY.

REFERENCES CITED

The following references are of record in the file of this patent:

UNITED STATES PATENTS

| Number | Name | Date |
|---|---|---|
| 2,177,638 | Draeger | Oct. 31, 1939 |
| 2,195,699 | Johnson | Apr. 2, 1940 |
| 2,226,618 | Kuppenbender | Dec. 31, 1940 |
| 2,279,463 | Hopkins | Apr. 14, 1942 |
| 2,314,497 | Hargrave | Mar. 23, 1943 |
| 2,332,810 | Place | Oct. 26, 1943 |
| 2,407,009 | Holbrook | Sept. 3, 1946 |
| 2,435,299 | Weiskopf | Feb. 3, 1948 |

FOREIGN PATENTS

| Number | Country | Date |
|---|---|---|
| 707,146 | Germany | June 14, 1941 |